(12) United States Patent
Vlacich et al.

(10) Patent No.: US 11,599,141 B2
(45) Date of Patent: Mar. 7, 2023

(54) COMPUTING UNIT ASSEMBLY AND A METHOD AND A SYSTEM FOR SYNCHRONIZING COMPUTING UNITS OF AN AIRCRAFT

(71) Applicant: Airbus Operations SAS, Toulouse (FR)

(72) Inventors: Christophe Vlacich, Toulouse (FR);
Bertrand Deshayes, Toulouse (FR);
Frédéric Viader, Toulouse (FR);
Laurent Lafont, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 59 days.

(21) Appl. No.: 17/222,153

(22) Filed: Apr. 5, 2021

(65) Prior Publication Data

US 2021/0311522 A1  Oct. 7, 2021

(30) Foreign Application Priority Data

Apr. 7, 2020  (FR) ...................... 2003473

(51) Int. Cl.
*G06F 1/12* (2006.01)
*B64D 45/00* (2006.01)
(Continued)

(52) U.S. Cl.
CPC .............. *G06F 1/12* (2013.01); *B64D 45/00* (2013.01); *G06F 1/08* (2013.01); *G06F 9/4881* (2013.01)

(58) Field of Classification Search
CPC . G06F 1/12; G06F 1/08; G06F 1/0077; G06F 1/14; G06F 9/5027
See application file for complete search history.

(56) References Cited

U.S. PATENT DOCUMENTS 5,239,641 A * 8/1993 Horst .................. G06F 11/1658
713/375
6,928,583 B2 * 8/2005 Griffin ................ G06F 11/1645
714/11
(Continued)

FOREIGN PATENT DOCUMENTS

EP    1283468 A2    2/2003

OTHER PUBLICATIONS

French Search Report; priority document.

*Primary Examiner* — Raymond N Phan
(74) *Attorney, Agent, or Firm* — Greer, Burns & Crain, Ltd.

(57) ABSTRACT

A synchronizing system including a generation unit for generating a synchronizing pulse from data of an independent clock, the synchronizing pulse being generated in a periodic manner, transmission links to transmit the synchronizing pulse to all the computation units, and in each of the computation units, a control element to compare the synchronizing pulse that has been received to a pulse generated by an internal clock of the computation unit and to detect a compliance or a lack of compliance, a scheduler of each of the computation units activating a sequence of partitions when the synchronizing pulse is received, and this only if the control element has detected a compliance. The synchronizing system is configured to synchronize the computation units in a reliable and accurate manner and to increase the operating safety of these computation units.

12 Claims, 3 Drawing Sheets

(51) Int. Cl.
*G06F 1/08* (2006.01)
*G06F 9/48* (2006.01)

(56) References Cited

U.S. PATENT DOCUMENTS

| | | | |
|---|---|---|---|
| 7,107,484 B2* | 9/2006 | Yamazaki | G06F 11/1691 |
| | | | 714/34 |
| 7,996,714 B2* | 8/2011 | O'Connell | G06F 11/184 |
| | | | 714/11 |
| 8,799,706 B2* | 8/2014 | Bruckert | G06F 11/1687 |
| | | | 712/27 |
| 9,342,358 B2* | 5/2016 | Smith, II | G06F 11/1691 |
| 10,931,510 B2* | 2/2021 | Rayrole | G06F 11/1679 |
| 2002/0152418 A1 | 10/2002 | Griffin et al. | |
| 2008/0196037 A1 | 8/2008 | Ple | |
| 2020/0164965 A1* | 5/2020 | Fervel | B64C 13/503 |
| 2020/0228704 A1* | 7/2020 | Ito | H04N 5/23227 |

* cited by examiner

COMPUTING UNIT ASSEMBLY AND A METHOD AND A SYSTEM FOR SYNCHRONIZING COMPUTING UNITS OF AN AIRCRAFT

CROSS-REFERENCES TO RELATED APPLICATIONS

This application claims the benefit of the French patent application No. 2003473 filed on Apr. 7, 2020, the entire disclosures of which are incorporated herein by way of reference.

FIELD OF THE INVENTION

The present invention relates to a method and to a system for synchronizing computing units of an aircraft, in particular of a transport plane, the computing units being grouped together into a set of computing units.

BACKGROUND OF THE INVENTION

In the context of the present invention, the computing units:
- may each correspond to a computer, the set of computing units then representing a set of computers, comprising, for example, a master computer and a slave computer; or
- may correspond to various channels or various modules of a single computer, the set (of computing units) then representing the computer and the computing units corresponding to these channels or modules.

In addition, in the context of the present invention, the computing units of the set of computing units implement at least in part the same types of partition. Each partition implements at least one (software) function, for example for controlling actuators of a rudder in the case of a flight control computer.

It is known that an aircraft, in particular a transport plane, generally comprises several sets of computing units, and, in particular, a set of flight control computers that compute control orders for controlling actuators of rudders of the aircraft. In general, some of the computers are used in control mode (COM) and the other computers are used in monitoring mode (MON), a computer in monitoring mode monitoring the operation of a computer in control mode. The computers are thus distributed into COM/MON pairs.

Furthermore, some of the computers of the aircraft may be of duplex type, that is to say, they comprise two modules forming, for example, a channel A and a channel B. Each function implemented by the computer is duplicated on each of the channels A and B, one of the channels acting in control mode (COM) and the other in monitoring mode (MON). This makes it possible to perform COM/MON monitoring during which, for each function implemented by the computer, the channel acting in monitoring mode monitors the channel acting in control mode so as to detect any failure of the pair of channels.

Regardless of the architecture under consideration, it is necessary for the computing units of such a set of computing units to be able to be synchronized accurately and reliably, while at the same time providing safety means.

There is therefore a need for such synchronization.

SUMMARY OF THE INVENTION

The present invention aims to address this need. It relates to a system for synchronizing at least two computing units of an aircraft, these two computing units being able to implement a plurality of identical partitions, each of the computing units comprising at least a scheduler, an internal clock and a software platform comprising the plurality of partitions.

According to the invention, the synchronization system comprises:
- a generation unit configured so as to generate a synchronization pulse, the generation unit being associated with an independent clock and comprising a form generator for generating a calibrated synchronization pulse based on data from the clock, the synchronization pulse being generated periodically;
- transmission links configured so as to transmit the synchronization pulse to each of the computing units; and
- in each of the computing units, a control element configured so as to compare the synchronization pulse received by the computing unit with a pulse generated by the internal clock of this computing unit, and to conclude therefrom that there is conformity or a lack of conformity on the basis of this comparison, and the scheduler of each of the computing units is configured so as to trigger a sequence of implementing at least some of the partitions upon receiving the synchronization pulse, and to do so only when the control element of the corresponding computing unit concludes that there is conformity.

The synchronization system is thus able to reliably and accurately synchronize the computing units (in particular using a clock that is independent of the internal clocks of the computing units).

In addition, by virtue of the control element, the synchronization is taken into account only if there is conformity of the synchronization pulse, thereby making a contribution to the operational reliability of the computing units. Specifically, advantageously, the synchronization system is configured so as to stop taking into account processing operations of one of the computing units when the control element of this computing unit concludes that there is a lack of conformity.

Furthermore, advantageously, the generation unit is configured so as to generate the first synchronization pulse after receiving an item of availability information from each of the computing units.

Moreover, in one particular embodiment, the synchronization system comprises a delay generator arranged between the generation unit and the computing units and configured so as to add delays to the synchronization pulse, the delays being different depending on the computing units intended to receive the synchronization pulse, each of the computing units taking into account the synchronization pulse with the corresponding delay as received from the delay generator.

Furthermore, in one particular embodiment, the synchronization system comprises direct synchronization elements configured so as to synchronize the computing units in order to synchronize one or more partitions within the partition sequence.

The present invention also relates to a method for synchronizing at least two computing units of an aircraft, these two computing units being able to implement a plurality of identical partitions, each of the computing units comprising at least a scheduler, an internal clock and a software platform comprising the plurality of partitions.

According to the invention, the synchronization method comprises at least the sequence of the following steps, the sequence of steps being implemented repeatedly:

a generation step, implemented by a generation unit, of generating a synchronization pulse, the synchronization pulse being generated based on data from an independent clock associated with the generation unit;

a transmission step, implemented by transmission links, of transmitting the synchronization pulse to each of the computing units;

control steps, specifically, a control step for each of the computing units, each of the control steps, which is implemented by a control unit, comprising comparing the synchronization pulse received by the computing unit with a pulse generated by the internal clock of this computing unit, and in concluding therefrom that there is conformity or a lack of conformity on the basis of this comparison; and triggering steps, specifically a triggering step for each of the computing units, each of the triggering steps, which is set by the scheduler of the corresponding computing unit, comprising triggering a sequence of implementing at least some of the partitions upon receiving the synchronization pulse, and doing so only when the corresponding control step concludes that there is conformity.

Advantageously, the synchronization method comprises a stopping step of stopping taking into account processing operations of one of the computing units when the control step in relation to this computing unit concludes that there is a lack of conformity.

Furthermore, advantageously, the generation step generates the first synchronization pulse after receiving an item of availability information from each of the computing units.

Moreover, in one particular embodiment, the synchronization method comprises a delay generation step, implemented by a delay generator, of adding delays to the synchronization pulse, the delays being different depending on the computing units intended to receive the synchronization pulse, the control step and the triggering step taking into account each time the synchronization pulse with the corresponding delay as received by the corresponding computing unit.

Furthermore, in one particular embodiment, the synchronization method comprises at least one direct synchronization step of synchronizing the computing units in order to synchronize one or more partitions within the partition sequence.

The present invention furthermore relates to:
a set of computing units comprising at least two computing units and a synchronization system such as the one described above, each of the computing units comprising at least a scheduler, an internal clock and a software platform; and/or
an aircraft, in particular a transport plane, comprising such a set of computing units.

BRIEF DESCRIPTION OF THE DRAWINGS

The appended figures will give a good understanding of how the invention may be implemented. In these figures, identical references denote similar elements.

DETAILED DESCRIPTION OF THE PREFERRED EMBODIMENTS

Figure 1:
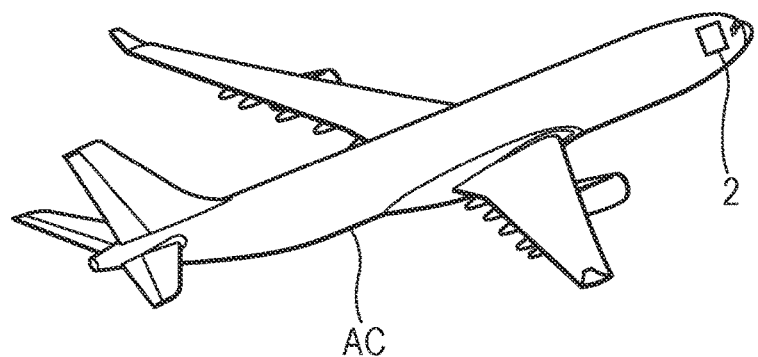
FIG. 1 is a schematic perspective view of an aircraft equipped with a set of computing units, provided with a synchronization system.

The synchronization system 1, illustrating the invention and as described below with reference to FIGS. 3 and 4, forms part of a set 2 of computing units of an aircraft AC, in particular of a transport plane as shown by way of example in FIG. 1.

Figure 2:
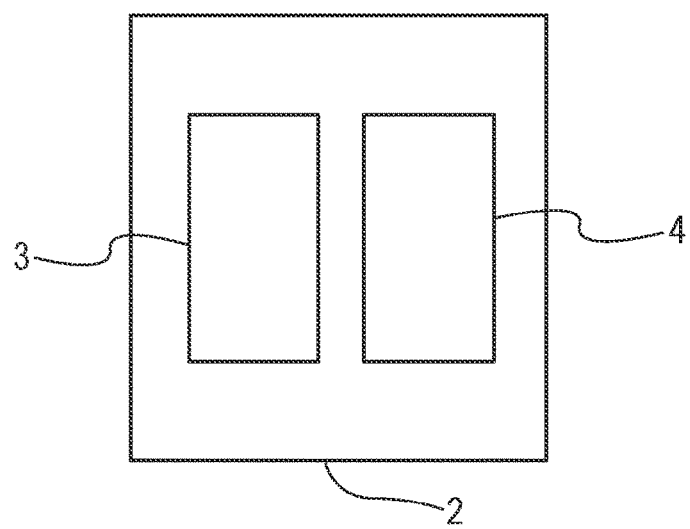
FIG. 2 is an overview of one example of a set of two computing units.

The set 2 is shown in FIG. 2, in one particular embodiment, with two computing units 3 and 4, in the form of a dual platform. The following description relates to such an example with two computing units 3 and 4, although, in the context of the present invention, the set 2 may comprise more than two computing units, for example three, four, etc. computing units.

Figure 3:
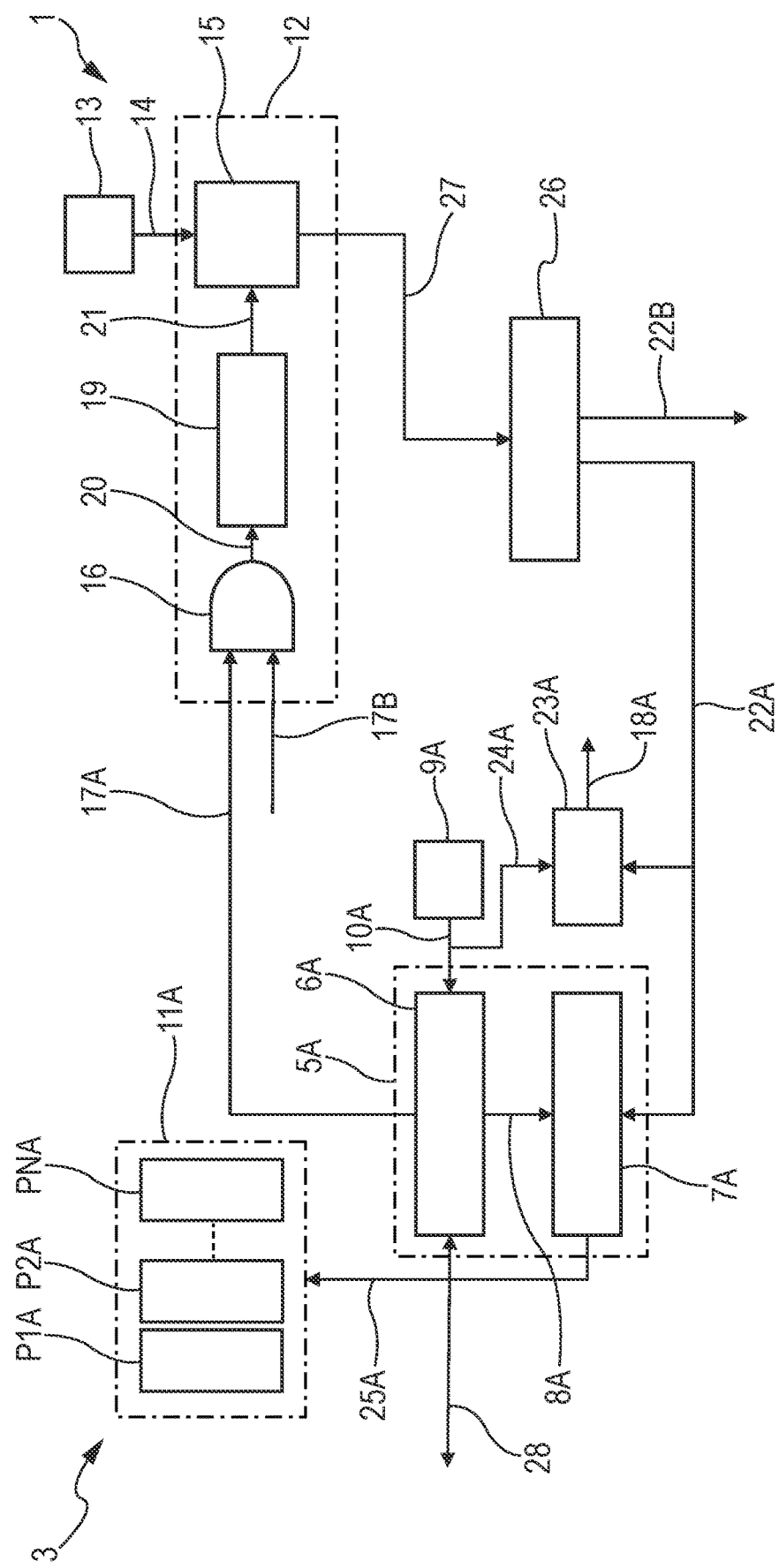
FIG. 3 is an overview of one particular embodiment of a master computing unit, provided with a synchronization system.
Figure 4:
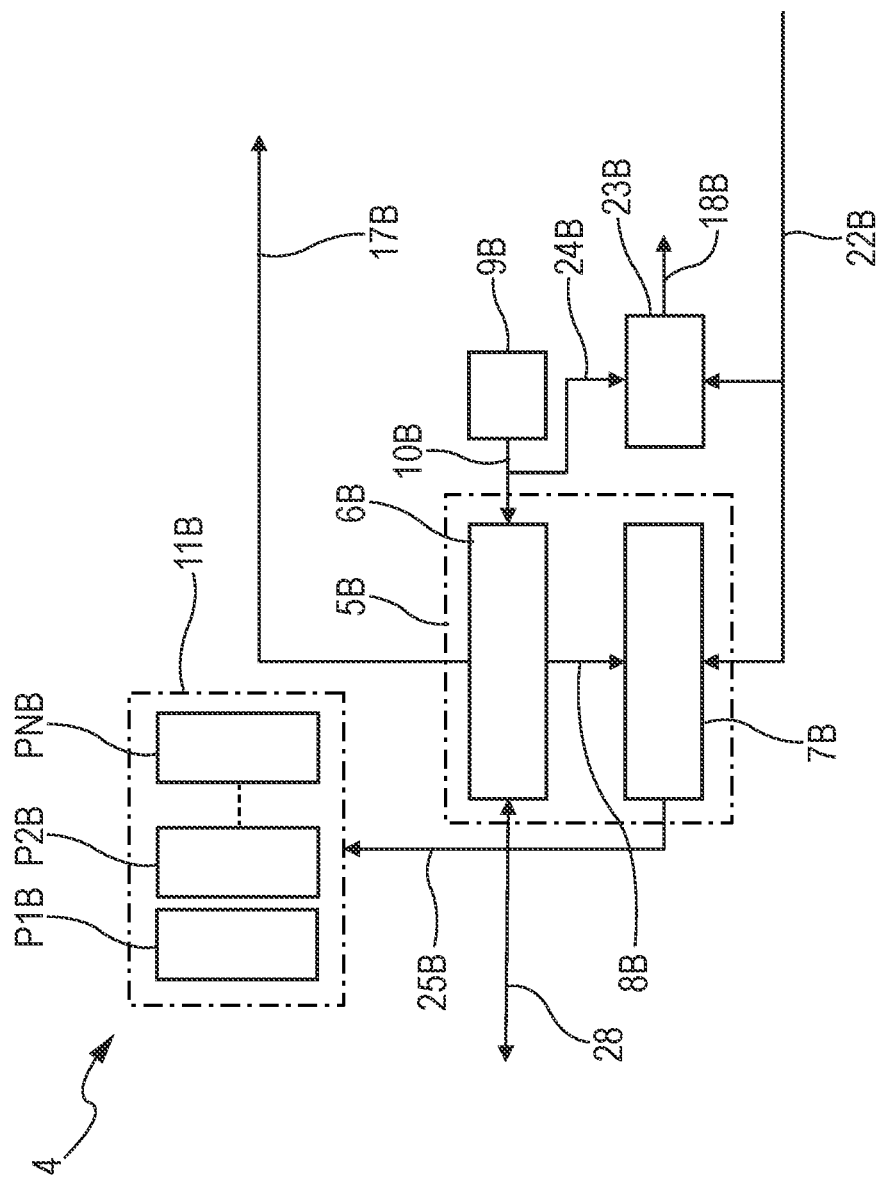
FIG. 4 is an overview of one particular embodiment of a slave computing unit, forming part of the same set of computing units as the master computing unit from FIG. 3.

In the example shown in FIGS. 2 to 4, the computing unit 3 is considered to be a master unit, and the computing unit 4 is considered to be a slave unit.

In the context of the invention, the computing units may each correspond:
to a computer, the set of computing units then representing a set of computers; or
to a channel or to a module of just one and the same computer, the set (of computing units) then representing the computer and the computing units corresponding to these channels or modules.

The computing unit 3 comprises in particular, as shown in FIG. 3:
a platform 5A comprising an operating system 6A intended, in particular, to manage the execution of programs and a scheduler 7A connected to the operating system 6A via a link 8A, the scheduler 7A making it possible in particular to establish and to control a partition implementation sequence;
an internal clock 9A connected to the operating system 6A via a link 10A; and
a software platform 11A.

The software platform 11A comprises partitions P1A, P2A, . . . , PNA, N being an integer greater than 1.

The computing unit 4 furthermore comprises, in particular, as shown in FIG. 4:
a platform 5B comprising an operating system 6B intended, in particular, to manage the execution of programs and a scheduler 7B connected to the operating system 6B via a link 8B, the scheduler 7B making it possible in particular, to establish and to control a partition implementation sequence;
an internal clock 9B connected to the operating system 6B via a link 10B; and
a software platform 11B.

The software platform 11B comprises partitions P1B, P2B, . . . , PNB, N being an integer greater than 1.

The partitions P1B to PNB of the software platform 11B are identical, respectively, to the partitions P1A to PNA of the software platform 11A.

These partitions P1A to PNA and P1B to PNB perform processing operations in relation to conventional functions that the set 2 of computing units 3 and 4 on the aircraft AC has to implement, such as generating control orders for rudders of the aircraft AC, for example.

The synchronization system 1 moreover comprises, as shown in FIG. 3, a generation unit 12 configured so as to generate a synchronization pulse, which is a voltage pulse. The generation unit 12 is associated with a clock 13, to which it is connected via a link 14. The clock 13 is independent of the internal clocks 9A and 9B of the computing units 3 and 4.

The generation unit 12 comprises a form generator 15 for generating a calibrated synchronization pulse based on data from the clock 13.

The generation unit 12 also comprises:
- a reception element 16 linked to the platforms 5A and 5B of the computing units 3 and 4 via links 17A and 17B and configured so as to receive an item of availability information from each of the computing units 3 and 4. This item of availability information indicates that the corresponding computing unit is ready to receive a synchronization pulse; and
- a pulse generator 19 connected to the reception element 16 and to the form generator 15 via links 20 and 21, respectively. The pulse generator 19 generates a pulse that is shaped (or calibrated) by the form generator 15, before being transmitted as explained below. The form generator 15 generates a synchronization pulse having a given electrical or temporal form, in order to correct the execution time drift of the partitions of the computing units 3 and 4, which are asynchronous. This synchronization pulse is transmitted by the generation unit 12.

The pulse generator 19 generates a pulse when it has received an item of availability information from all of the computing units 3 and 4. In one particular embodiment, the pulse generator 19 provides an additional delay in order to guarantee the correct reception of all of the items of availability information.

The generation unit 12 is configured so as to generate:
- the first synchronization pulse after receiving an item of availability information from each of the computing units 3 and 4; and
- the following synchronization pulses (other than the first synchronization pulse), periodically, that is to say, at identical time intervals, for example, every 5 milliseconds.

The synchronization system 1 additionally comprises:
- transmission links 22A and 22B configured so as to (periodically) transmit a synchronization pulse to each of the computing units 3 and 4; and
- in each of the computing units 3 and 4, a control element 23A, 23B.

The control element 23A of the computing unit 3 compares the synchronization pulse, generated by the generation unit 12 and received via the transmission link 22A, with a pulse generated by the internal clock 9A of the computing unit 3. Based on this comparison, the control element 23A concludes that there is conformity or a lack of conformity as explained below.

Likewise, the control element 23B of the computing unit 4 compares the synchronization pulse, generated by the generation unit 12 and received via the transmission link 22B, with a pulse generated by the internal clock 9B of the computing unit 4. Based on this comparison, the control element 23B concludes that there is conformity or a lack of conformity.

In the context of the present invention, it is considered:
- that there is conformity if the synchronization pulse and the pulse generated by the internal clock have the same (temporal) form; and
- that there is a lack of conformity if the synchronization pulse and the pulse generated by the internal clock have different (temporal) forms.

In addition, the scheduler 7A of the computing unit 3 is configured so as to trigger a sequence of implementing at least some of the partitions P1A to PNA, via a link 25A, upon receiving the synchronization pulse, and to do so only when the control element 23A of the computing unit 3 concludes that there is conformity.

Likewise, the scheduler 7B of the computing unit 4 is configured so as to trigger a sequence of implementing at least some of the partitions P1B to PNB, via a link 25B, upon receiving the synchronization pulse, and to do so only when the control element 23B of the computing unit 4 concludes that there is conformity.

Therefore, each scheduler 7A, 7B triggers the partition implementation sequence as soon as it receives the synchronization pulse. When the sequence is complete, the scheduler 7A, 7B awaits the reception of the following synchronization pulse to trigger another partition implementation sequence.

The synchronization system 1 is furthermore configured so as:
- to stop taking into account processing operations of the computing unit 3 when the control element 23A of this computing unit 3 concludes that there is a lack of conformity. This information may be transmitted to a dedicated system (not shown) via a link 18A; and
- to stop taking into account processing operations of the computing unit 4 when the control element 23B of this computing unit 4 concludes that there is a lack of conformity. This information may be transmitted to a dedicated system (not shown) via a link 18B.

Processing operations of a computing unit may stop being taken into account in various ways, for example by stopping the operation of the computing unit or by not taking into account the information that it generates. This stoppage makes a significant contribution to the reliability of the set 2 of computing units, in particular when these are computing units (or computers) that have an impact on the flight safety of the aircraft AC, such as a flight control computer, for example.

The synchronization system 1, as described above, is therefore able to achieve reliable and effective synchronization of the computing units 3 and 4 of the set 2 (in particular, by virtue of the clock 13, which is independent of the internal clocks 9A and 9B of the computing units 3 and 4). In addition, by virtue, in particular, of the control element 23A, 23B, the synchronization is taken into account only if there is conformity of the synchronization pulse, thereby contributing to increasing the operational reliability of the set 2 (of which the synchronization system 1 forms part).

In the particular embodiment shown in FIGS. 3 and 4, the synchronization system 1 is arranged close to the computing unit 3. It may also be contemplated to integrate it into the computing unit 3, or else to arrange it close to or in the computing unit 4. Furthermore, in one particular embodiment, the synchronization system 1 may be housed in a dedicated module, different from the computing units 3 and 4.

Moreover, in one particular embodiment, the synchronization system 1 comprises a delay generator 26 arranged between the generation unit 12 and the computing units 3 and 4. This delay generator 26 is configured so as to add delays to the synchronization pulse, received via a link 27 of the generation unit 12. The added delays are different depending on the computing units 3 and 4 intended to receive the synchronization pulse. Each of the computing units 3 and 4 takes into account the synchronization pulse with the corresponding delay as received from the delay generator 26 via the link 22A, 22B. This makes it possible to desynchronize the computing units 3 and 4, while at the same time making it possible to trigger the partition sequences with the same periodicity. This feature makes it possible, in particular, to prevent an event (in particular, an external event) that is liable to interfere with the computing units 3 and 4 from occurring at exactly the same time when the same partition is implemented and from generating an erroneous processing operation of this partition on all of the computing units 3 and 4 of the set 2. This feature (generating a time offset) thus provides additional assistance for the reliability of the set 2.

This last particular embodiment (which consumes computing resources) is preferably implemented only if the operational reliability conditions require such additional protection.

Furthermore, in one particular embodiment, the synchronization system 1 comprises direct synchronization elements (not shown). These direct synchronization elements are configured so as to directly synchronize the computing units 3 and 4 of the set 2, via a link 28 linking together the operating systems 6A and 6B of the computing units 3 and 4. The purpose of these direct synchronization elements is to synchronize the triggering, at a given time, of one or more partitions within the partition sequence, the partition sequence, for its part, being triggered upon each new synchronization pulse. This direct (partition) synchronization is therefore performed at short time intervals within the generation period of the synchronization pulse.

Figure 5:
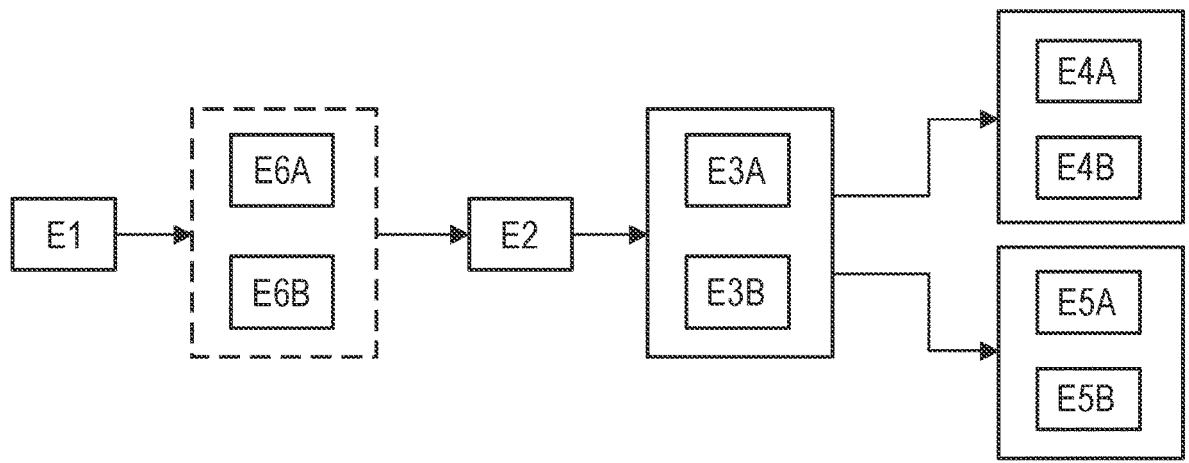
FIG. 5 schematically illustrates the main steps of a synchronization method.

The synchronization system 1 for synchronizing the set 2 of computing units 3 and 4, as described above, is able to implement a synchronization method shown in FIG. 5.

This synchronization method comprises at least the sequence of following steps, the sequence of steps being implemented repeatedly:
- a generation step E1, implemented by the generation unit 12, of generating a synchronization pulse. The synchronization pulse is generated based on data from the clock 13 associated with the generation unit 12. The generation step E1 generates the first synchronization pulse after receiving an item of availability information from each of the computing units 3 and 4, and generates the following synchronization pulses periodically;
- a transmission step E2, implemented by the transmission links 22A and 22B, of transmitting the synchronization pulse to each of the computing units 3 and 4;
- control steps E3A and E3B, specifically a control step E3A, E3B for each of the computing units 3 and 4. Each of the control steps E3A and E3B, which is implemented by the control element 23A, 23B, such as a controller, comprises comparing the synchronization pulse received by the computing unit 3, 4 with a pulse generated by the internal clock 9A, 9B of the computing unit 3, 4, and in concluding therefrom that there is conformity or a lack of conformity on the basis of this comparison; and:
- one or more triggering steps E4A and E4B, specifically a triggering step for each of the computing units 3 and 4. Each of the triggering steps E4A and E4B that is set by the scheduler 7A, 7B of the computing unit 3, 4 comprises triggering a sequence of implementing at least some of the partitions PA1 to PNA, PB1 to PNB upon receiving the synchronization pulse, when the corresponding control step E3A, E3B concludes that there is conformity; or
- one or more stopping steps E5A, E5B of stopping taking into account processing operations of one of the computing units 3 and 4 when the control step E3A, E3B in relation to this computing unit 3, 4 concludes that there is a lack of conformity.

Moreover, in one particular embodiment, the synchronization method comprises a delay generation step E6A, E6B, implemented (by the delay generator 26) between the generation step E1 and the transmission step E2. Since this delay generation step E6A, E6B is optional, it is shown in dashed lines in FIG. 5. This delay generation step E6A, E6B comprises adding delays to the synchronization pulse. The delays are different depending on the computing units 3 and 4 intended to receive the synchronization pulse. The control step E3A, E3B and the triggering step E4A, E4B take into account each time the synchronization pulse with a corresponding delay as received by the corresponding computing unit 3, 4.

Furthermore, in one particular embodiment, the synchronization method comprises at least one direct synchronization step (not shown) of synchronizing the computing units 3 and 4 in order to synchronize one or more partitions within the partition sequence.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly comprising a system for synchronizing at least two computing units of an aircraft, the two computing units being configured to implement a plurality of identical partitions, each of said computing units comprising at least a scheduler, an internal clock and a software platform comprising said plurality of partitions, wherein the system comprises:
   a generation unit configured to generate a synchronization pulse, said generation unit having an independent clock and comprising a pulse generator and a form generator, the pulse generator generating a pulse that is shaped by the form generator to correct an execution time drift of the identical partitions of the computing units, the form generator generating a calibrated synchronization pulse based on data from said clock, said synchronization pulse being generated periodically, the generation unit further comprising a receiving element configured to receive information from each of the computing units;
   transmission links configured to transmit the synchronization pulse to each of said computing units; and
   in each of said computing units, a control element configured to compare the synchronization pulse received by the computing unit with a pulse generated by the internal clock of the computing unit, and to conclude therefrom that there is conformity when the synchronization pulse and the pulse generated by the internal clock are of the same temporal form or a lack of conformity when the synchronization pulse and the pulse generated by the internal clock are of different temporal forms based on such a comparison, and wherein the scheduler of each of said computing units is configured to trigger a sequence of implementing at least some of said partitions upon receiving the synchronization pulse, and to do so only when the control element of the corresponding computing unit concludes that there is conformity.

2. The assembly as claimed in claim 1, wherein the system is configured to stop taking into account processing operations of one of said computing units when the control element of said computing unit concludes that there is a lack of conformity.

3. The assembly as claimed in claim 1, wherein the generation unit is configured to generate a first synchronization pulse after receiving an item of availability information from each of said computing units.

4. The assembly as claimed in claim 1, further comprising a delay generator arranged between the generation unit and said computing units and configured to add delays to the synchronization pulse, the delays being different depending on the computing units intended to receive the synchronization pulse, each of said computing units taking into account the synchronization pulse with the corresponding delay as received from the delay generator.

5. The assembly as claimed in claim 1, further comprising direct synchronization elements configured to synchronize the computing units to synchronize one or more partitions within the partition sequence.

6. A set of computing units, further comprising at least two computing units and a synchronization system as claimed in claim 1, each of said computing units comprising at least a scheduler, an internal clock and a software platform.

7. A method for synchronizing at least two computing units of an aircraft, these two computing units being configured to implement a plurality of identical partitions, each of said computing units comprising at least a scheduler, an internal clock and a software platform comprising said plurality of partitions, the method comprising at least the sequence of following steps, said sequence of steps being implemented repeatedly:

a generating step, implemented by a generation unit, of generating a calibrated synchronization pulse, said synchronization pulse being generated based on data from an independent clock associated with the generation unit, wherein the generation unit comprises a pulse generator, and a form generator, the pulse generator generating a pulse that is shaped by the form generator to correct an execution time drift of the identical partitions of the computing units, the form generator generating the calibrated synchronization pulse, the calibrated synchronization pulse being generated periodically, and the generation unit further comprising a receiving element configured to receive information from each of the computing units;

a transmitting step, implemented by transmission links, of transmitting the synchronization pulse to each of said computing units;

controlling steps, specifically a control step for each of said computing units, each of said controlling steps, which is implemented by a controller, comprising comparing the synchronization pulse received by the computing unit with a pulse generated by the internal clock of this computing unit, and in concluding therefrom that there is conformity when the synchronization pulse and the pulse generated by the internal clock are of the same temporal form or a lack of conformity when the synchronization pulse and the pulse generated by the internal clock are of different temporal forms based on this comparison; and triggering steps, specifically a triggering step for each of said computing units, each of said triggering steps, which is set by the scheduler of the corresponding computing unit, comprising triggering a sequence of implementing at least some of said partitions upon receiving the synchronization pulse, and doing so only when the corresponding control step concludes that there is conformity.

8. The method as claimed in claim 7, further comprising a stopping step of stopping taking into account processing operations of one of said computing units when the control step in relation to this computing unit concludes that there is a lack of conformity.

9. The method as claimed in claim 7, wherein the generating step generates a first synchronization pulse after receiving an item of availability information from each of said computing units.

10. The method as claimed in claim 7, further comprising a delay generation step, implemented by a delay generator, of adding delays to the synchronization pulse, the delays being different depending on the computing units intended to receive the synchronization pulse, the control step and the triggering step taking into account each time the synchronization pulse with a corresponding delay as received by the corresponding computing unit.

11. The method as claimed in claim 7, further comprising at least one direct synchronization step of synchronizing the computing units to synchronize one or more partitions within the partition sequence.

12. An aircraft comprising a set of computing units as claimed in claim 6.

* * * * *